Sept. 7, 1965

A. M. SEVERDIA 3,204,493

STANDARDIZED COMBINATION UNIVERSAL
DRILL JIG AND MILLING FIXTURE

Filed July 26, 1962

*INVENTOR.*
Anton M. Severdia

BY
Julian Caplan
attorney

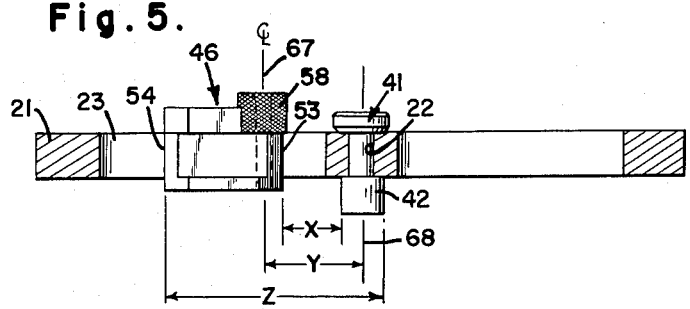
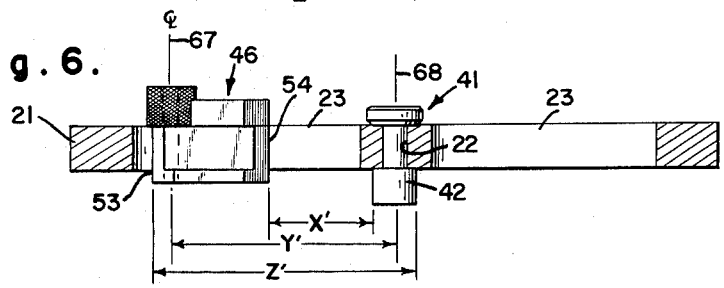
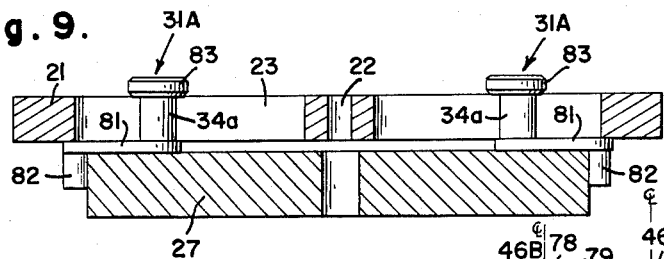
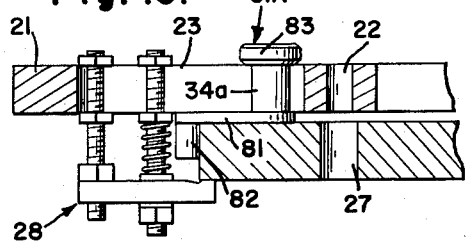
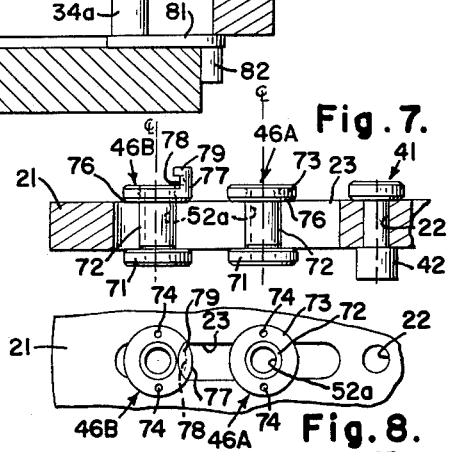
INVENTOR.
Anton M. Severdia
BY Julian Caplan
attorney Sept. 7, 1965 A. M. SEVERDIA 3,204,493
STANDARDIZED COMBINATION UNIVERSAL
DRILL JIG AND MILLING FIXTURE
Filed July 26, 1962 4 Sheets-Sheet 3
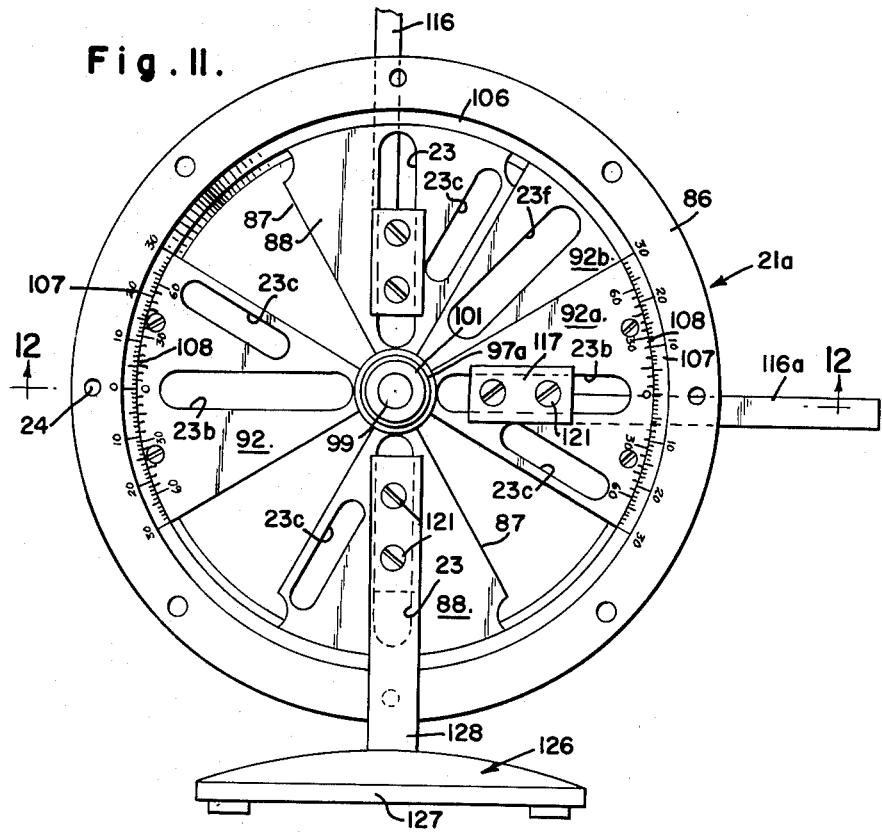
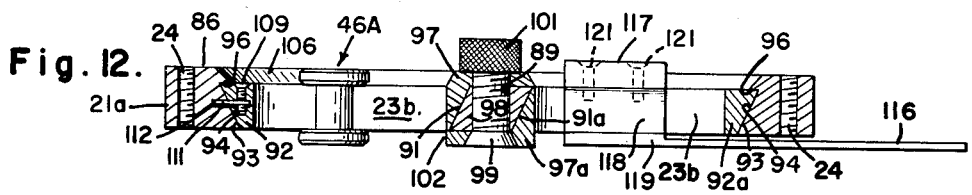
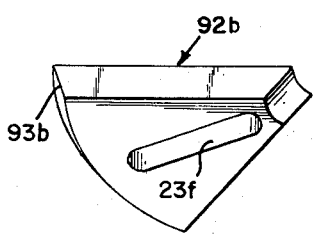
INVENTOR.
Anton M. Severdia
BY Julian Caplan
  attorney Sept. 7, 1965                A. M. SEVERDIA                3,204,493
                    STANDARDIZED COMBINATION UNIVERSAL
Filed July 26, 1962        DRILL JIG AND MILLING FIXTURE
                                                    4 Sheets-Sheet 4
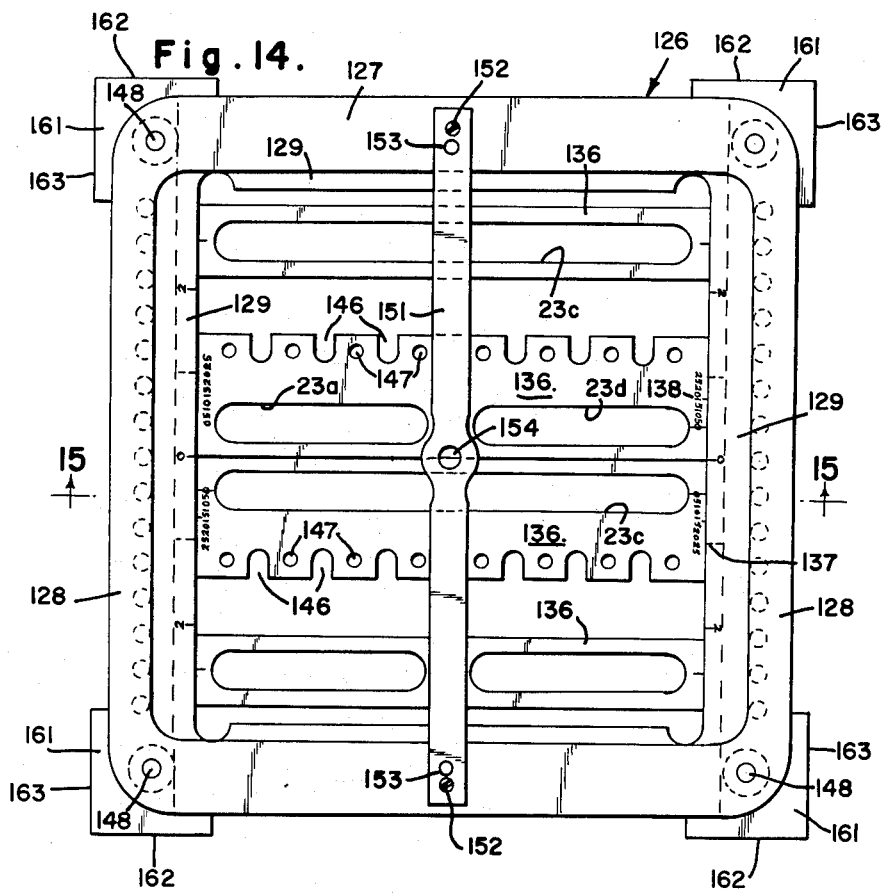
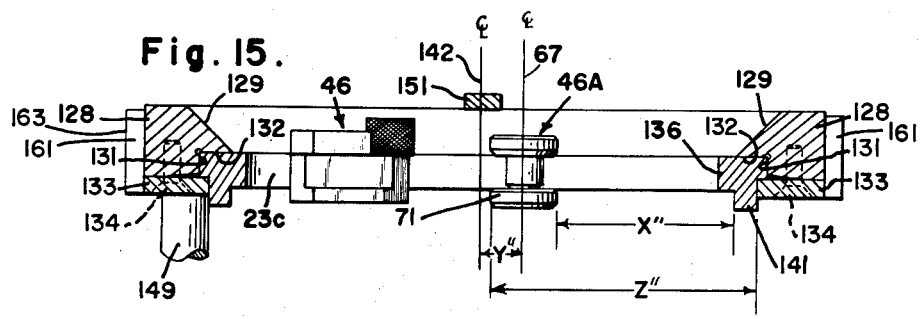
INVENTOR.
Anton M. Severdia
BY
Julian Caplan
attorney United States Patent Office 3,204,493
Patented Sept. 7, 1965

3,204,493
STANDARDIZED COMBINATION UNIVERSAL
DRILL JIG AND MILLING FIXTURE
Anton M. Severdia, % Severdia Manufacturing Co.,
1590 Laurel St., Portola Valley, Calif.
Filed July 26, 1962, Ser. No. 212,684
29 Claims. (Cl. 77—62)

This invention relates to a new and improved standardized master drill jig. More particularly the invention relates to a jig having provision for accurately locating in a plurality of positions of adjustment bushings and liners for drilling, tapping, chamfering, counter-boring, spot-facing or reaming tools, and the like, in prototype or production work. A particular use for the invention is for multiple head drilling machines wherein work is clamped to the fixture and various power driven tools are located by insertion through the bushings or liners.

Heretofore jigs used with multiple head machines of the character heretofore described require elaborate and expensive tooling operations to locate clamps, bushings, locating buttons, knobs, and the like, in proper position for the particular job. Usually, such jigs are useful only for one particular job and must be discarded or radically reworked for other jobs. The present invention provides an adjustable jig which can rapidly and comveniently be set up for a particular job and, when the job is completed, can be used for a variety of other jobs. The economic advantage of the jig over conventional practice is thus obvious.

A feature and advantage of the invention is the facility with which the adjustable parts of the jig may be located and locked in position, thereby materially decreasing the time and expense of set-up.

An important feature of the invention is the standardization which may be accomplished by means of the present invention. Thus, a plurality of different kinds of fittings is used with basic jig plates, all as hereinafter described in detail. These fittings are preferably standardized in dimension and shape so that by means of vernier calipers, micrometers, gage blocks and the like, each standard part may be located in the desired position with precise measurement of the particular fitting. Thus, fixed dimensions and interchangeability of parts facilitate setting up the job.

In accordance with the present invention, a plate is provided formed with slots and holes, all hereinafter described in detail. Slidable in the slots are fittings which can, when properly adjusted, be locked in place. Some of the fittings may be used to hold slip removable bushings, and also to serve as bushings and liners for bushings, thereby being adaptable to multiple head drilling, tapping, chamfering, counter-boring, spot-facing or reaming operations. Other fittings may be locked in the slots or other locations in the plate to serve as work locaters which accurately locate the work with reference to the plate. Still other fittings comprise support legs, supporting the plate with reference to the bed of the machine. Finally, additional fittings may be used to provide locating surfaces from which measurements to other fittings may be dimensioned. A feature and advantage of the invention is the facility with which the fittings heretofore mentioned may be installed in the plate and accurately positioned and conveniently removed after their function has been served.

In accordance with the present invention, fittings may be positioned at various angles with respect to each other and also at various distances from a fixed center point. The various fittings which hold bushings and liners may be adjustably positioned on the plate and locked in place. Work may be positioned relative to the plate and clamped into position. The operations heretofore necessary to provide a jig of the aforementioned characteristics are reduced in labor and materials immeasurably.

Although in several forms of the invention the jig is shown as a circular plate with radial slots, nevertheless the invention may also be used in connection with rectangular or non-circular shapes, depending upon the type work to be performed.

A still further feature of the invention is its adaptability to precise measurement. Thus angles and distances may be measured with vernier devices to provide extreme accuracy. Further, distances may be measured by means of gage blocks of extreme accuracy and by means of vernier calipers and micrometers of comparable accuracy.

A still further feature of the invention is the fact that standard parts, such as slip removable bushings may be used in connection with the fittings which have heretofore been described or the fittings themselves may be so constructed as to provide the sleeves for such bushings.

Although the present invention is particularly adaptable for multiple head drilling, it will be understood that the device is also useful in prototype drilling in a drill press.

After holes have been formed in the work by means of fittings as has heretofore been described, the same jig may be used to hold the same workpiece in position for milling. In such use, the work is left in place on the jig and the jig inverted and fixed to the table of a milling machine. The workpiece may then be milled. After both sides of the jig have performed their function, the work may be removed from the jig.

Further, the jig may be attached to the table of a machine (such as a milling machine) with the jig plate at right angles to the table, or in the inverted position. This feature of the invention permits work to be performed on the workpiece as heretofore described and then additional operations to be performed on the drill press with the workpiece on edge, so to speak.

Other objects of the present invention will become apparent upon reading the following specification and referring to the accompanying drawings in which similar characters of reference represent corresponding parts in each of the several views.

In the drawings:

FIG. 5 is a view similar to FIG. 2 showing the fitting of FIG. 3 in one position and illustrating how the bushing may be accurately located relative to the center of the jig.

FIG. 6 is a view similar to FIG. 5 showing the fitting in a different position.

FIG. 7 is a fragmentary view of a portion of the structure of FIG. 5 and showing modified fittings.

FIG. 8 is a fragmentary plan view of the structure of FIG. 7.

FIG. 9 is a view similar to FIG. 2 showing use of one form of work locator to locate a workpiece.

FIG. 10 is a fragmentary view of a portion of the structure of FIG. 9 showing a standard clamp securing a workpiece to the jig.

FIG. 11 is a view similar to FIG. 1 of a modified jig plate.

FIG. 12 is a sectional view taken substantially along line 12—12 of FIG. 11.

FIG. 13 is a perspective view of an insert used in the plate of FIG. 11.

FIG. 14 is a view similar to FIG. 1 of a further modified plate.

FIG. 15 is a sectional view taken substantially along line 15—15 of FIG. 14.

Figure 1:
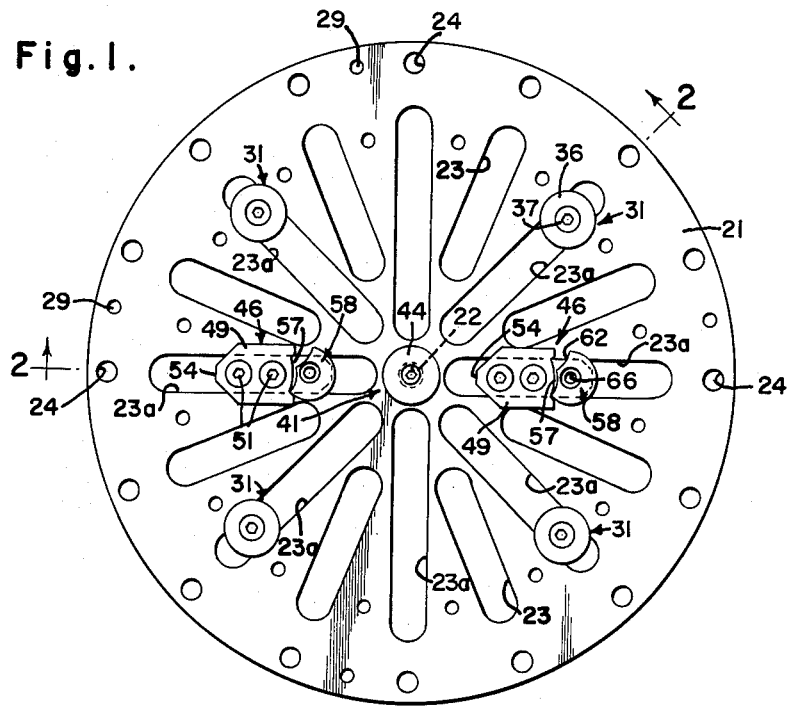
FIG. 1 is a plan view of one modification of the invention.

In the form of the invention shown in FIG. 1, there is provided a circular plate 21 having a central hole 22 and a plurality of radial slots 23, there being sixteen slots shown. Alternate slots 23a extend closer to the center of the disc to permit working closer to the center. It will be understood that the number of slots 23 is subject to wide variation and that a shop in which the present invention is used will have a plurality of plates 21 of different diameters and different angular spacing of slots 23. Around the perimeter of the plate is a plurality of tapped holes 24 in which fit legs 26 of a fixed height. Legs 26 rest upon or are fastened to the bed of the machine in which the jig is to be installed.

Figure 2:
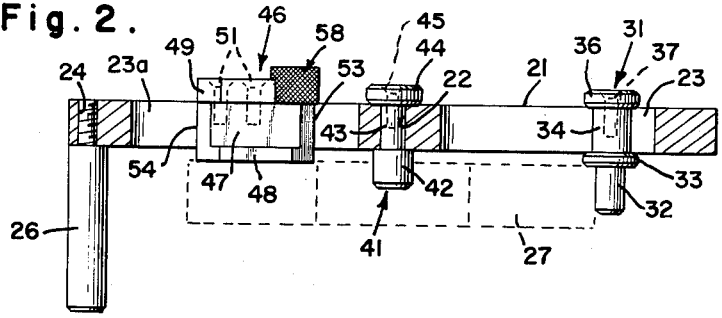
FIG. 2 is a sectional view taken substantially along line 2—2 of FIG. 1.
Figure 3:
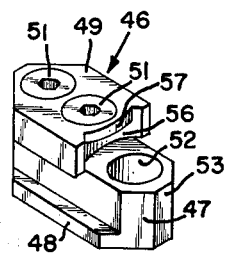
FIG. 3 is a perspective view of one form of fitting for a slip removable bushing.
Figure 4:
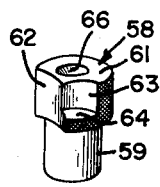
FIG. 4 is a perspective view of a bushing which may be used with this fitting of FIG. 3.

In one particular type of work with which the invention is to be used, a circular work workpiece 27 shown in dot and dash lines in FIG. 2 is positioned beneath the jig and is subsequently clamped thereto by means of standard clamps 28 (see FIG. 10) installed in suitable locations. Clamps 28 may be used with slots 23 or holes 24 or separate holes 29 or any other convenient means of attachment. To center the workpiece (here assumed to be a collar in which two holes are to be drilled) relative to the jig, four work locators 31 are employed. Such work locators have accurately ground cylinders 32 against which workpiece 27 abuts. Above cylinder 32 is collar 33 having a diameter larger than the width of slots 23. Above collar 33 is a cyindrical portion 34 fitting through one slot 23 and having a slightly less diameter than the width of slot 23. A thin button 36 having an outside diameter greater than the width of slots 23 is positioned above plate 21 and is formed with a hole through which fits screw 37 threaded into cylindrical portion 34 of work locator 31. When screw 37 is loosened, work locator 31 may be moved radially along slot 23 to the desired position. Thereupon, screw 37 is tightened, clamping the work locator to plate 21 in the desired location. The number of work locators 31 used depends upon the shape and other requirements of the job.

A centering plug 41 is preferably used in connection with the present invention to locate various fittings and after the fittings are installed the locator is removed. Such a plug 41 fits through hole 22. Below the jig is a buttom 42 of accurately ground outside diameter. A stem 43 fits up through hole 22 and a top 44 is held on the upper end of stem 43 by screw 45 to lock the centering plug 41 in position.

A bushing locator fitting 46 is positioned in one or more of the slots 23 of the jig, depending upon the requirements of the work. In the form of the invention shown in FIGS. 1 to 4 inclusive, the bushing locator 46 is generally diamond shaped in plan and formed in two parts. The lower part has a body 47 having the thickness of slot 23 and bottom side edge wider flanges 48 toward either side. The removable upper part 49 has a width greater than the width of slot 23 and a length less than body 47 and is secured to the lower part by means of screws 51. The fitting may thus be slid radially along slot 23 until it is in the desired location from the center and then locked in place by tightening screws 51, being clamped against plate 21 between flanges 48 on bottom member 47 and upper member 49. Adjacent one end of body 47 is a hole 52 which is quite accurately located with reference to the ground inner and outer ends of 53, 54 of lower body member 47. An arcuate undercut 56 is formed in one end of upper part 49 adjacent hole 52 providing an arcuate shoulder 57. A standard slip removable bushing 58 is provided having a shank 59 which fits into hole 52 and having a head 61 of larger diameter cut away in an arcuate cutout 62 and also a second arcuate cutout 63 of lesser depth terminating in a shoulder 64. The slip removable bushing 58 is inserted in hole 52 with first arcuate cutout 62 facing the undercut 56 of part 49. By twisting bushing 58 until shoulder 64 fits into undercut 56 and under shoulder 57, the bushing may be locked in place. Suitable bushings (not shown) may be fitted directly into the hole 52 in the liner of fitting 46.

An important feature of the invention is the precision with which bushing 58 may be located relative to the center of the jig. As has been mentioned, the two ends 53, 54 of fitting 46 are accurately ground as is centering button 42. The center 67 of hole 52 is accurately located relative to the two ends 53, 54 and preferably the distances between the center of hole 52 and each end 53, 54 are even decimals of an inch. As shown in FIG. 5 by placing gage blocks in space X between locating surface 53 and button 42, and by knowing the radius of button 42 and the distance between locating surface 53 and center 67, an accurate measurement Y may be obtained from the center 68 of the jig to the center 67 of the hole. By observation of FIG. 1, it will be seen that the fitting may be used in either of two positions, that is, with hole 52 located toward the center of the jig (left side), or located away from the center (right side). However, either dimension may be accurately measured. As shown in FIG. 6, by measuring distance $X^1$ and adding the radius of button 42 plus the distance from surface 54 to centerline 67, the distance $Y^1$ between centers 67 and 68 may be calculated. As an alternate means of measurement, a caliper or micrometer may be placed on the outside locating surface 54 in FIG. 5 and the opposite side of the work locating button 42. This measurement Z requires subtraction of the radius of locating button 42 and the distance between the center 67 of fitting 46 and locating surface 54, rather than addition as in the previous example. Similarly, in FIG. 6, measurement $Z^1$ between outside surface 53 and the far side of button 42 is made, radius of button 42 subtracted and the distance between surface 53 and centerline 67 is also subtracted to give distance $Y^1$.

It will be understood that tables may be prepared to assist in calculating distances Y and $Y^1$ if desired.

Directing attention now to FIGS. 7 and 8, modified forms of fittings 46A, 46B are shown. The lower portion of the fittings 46A, 46B is substantially identical. It has a button 71 on its lower end of accurately ground diameter which is greater than the width of slot 23 and the cylindrical surface of which is used as a locating surface. A stem 72 fits up through slot 23 and is threaded at its upper end. On the right-hand side of FIG. 7, a nut 73 is shown, such nut comprising a circular internally threaded member on the upper end of stem 72. Stem 72 has a hole 52a for a drill bushing or the like. A pair of diametrically opposed holes 74 is formed in nut 73 in which a spanner-type wrench may be installed to tighten the nut 73 onto stem 72. Preferably, a plastic washer 76 is inserted between nut 73 and the top surface of plate 21 to protect the surfaces against marring.

In the lefthand form of the invention shown in FIG. 7, a liner lock 46B is provided. Such liner lock is threaded onto the upper end of stem 72 and tightened by a spanner wrench fitting into holes 74. An upward extension 77 is formed at a portion of one edge of lock 46B and is cut away in an arcuate undercut 78 to provide a shoulder 79. A slip removable bushing of the type shown in FIG. 4 may be installed in the liner and locked in place, by turning until the shoulder 64 lodges under shoulder 79.

In the forms of the invention shown in FIGS. 7 and 8 the buttons 71 provide locating surfaces for use in conjunction with a button 42 in identical manner as in FIGS. 5 and 6. Thus, gage blocks or inside or outside calipers or micrometers may be used to measure the distance between button 71 and the center plug 42 using either the inside dimensions or the outside dimensions in a manner similar to that shown in FIGS. 5 and 6. The known radii of cylinders 42, 71 may be added or subtracted as required to give the distance between the centers of the hole 22 and fitting 46A or 46B.

A further modified fitting 31A is shown in FIG. 9 for locating or otherwise holding the workpiece. In this form of the invention, the lower portion of the fitting comprises a flat plate 81 having a round downward extending stud 82 on one end which engages the side of the workpiece 27 to be drilled or otherwise machined. Stud 82 is accurately ground and is used for measurement in a manner similar to the location of fittings 46A and 46B. A stem 34a having a diameter equal to the width of slots 23 projects up through slot 23. A nut 83 is threaded onto the threaded upper end of stem 34a or it may be secured to stem 34a by means of a screw similar to screw 37.

Still another form of the invention is shown in FIGS. 11 to 13. In this form of the invention the jig is a circular plate 21a having a rim 86 extending around its entire circumference but also has a plurality of segmental cutouts 87 between one or more fixed segments 88. The fixed segments 88 have a common center hole 89. The edges 91, 91a of segments 88 around hole 89 are preferably bevelled oppositely as shown in FIG. 12.

Movable sectors 92 are provided. The lefthand sector shown in FIG. 11 is thinner than the disc rim 86 and has a bevelled edge 93 which fits against undercut bevelled edge 94 of rim 86, the top surface of sector 92 engaging the underside of undercut shoulder 96 on rim 86. The inner end of sector 92 has a vertically upwardly offset circular portion 97 which rests on top of the circular central portion 98 of the permanent segment 88. The right-hand sector 92a is similarly fastened except that its central portion 97a is downwardly offset. A screw 99 fits through the holes in the offsets 97, 97a of the two movable sectors and also the hole 89. By tightening nut 101 on the upper end of screw 99, the movable sectors 92, 92a may be clamped in place. Preferably, the circular portion of the right-hand sector 92a has a cylindrical surface 102 which serves as a locating surface for various fittings 46A (or 46 or 46B) in exactly the same manner as the button 42 in FIGS. 2, 5 and 6 serves such purpose.

Slots 23b are formed in movable sectors 92, 92a as well as slots 23 in the permanent sectors 88 of the jig. Such slots 23, 23a receive various fittings such as work locators 31, 31A and fittings 46, 46A, 46B of the type shown in previous modifications. Additional shorter slots 23C may be positioned near the perimeter of the jig near slots 23 for work locators.

For accurate degree and minute of degrees location, the angles of the movable sectors 92, 92a relative to stationary sectors 88 may be measured. Thus, on bevelled surface 106 of rim 86, angles 107 are inscribed and a vernier scale 108 is inscribed in the companion top surface of sector 92 or 92a. Once the angle has been located, it may be set by block screws 109 threaded into movable sector 92 and engaging lock bars 111 which extend out of a recess in the edge of movable sector 92 and into an arcuate recess 112 in the matching surface of rim 86.

As shown in FIGS. 11 and 13, a removable sector 92b may be inserted in a cutout 87. Sector 92b in use fits under center portion 97. The angular width of sector 92b is such that it will slip between the edges of sectors 88 and 92a. The bevelled outer edge 93b fits on surface 94. A corresponding screw 98 and nut 101 are used to lock the sector 92b in place. Slot 23f in sector 92b functions as in previous modifications.

The jig shown in FIGS. 11 and 12 may also be used as a protractor. Thus straight edges 116, 116a accurately aligned with the longitudinal center lines of slots 23, 23b may be provided. Such straight edge 116a has an enlargement 117 at its inner end of a width greater than the width of slot 23b. A bottom body 118 having a main portion equal to the width of slot 23 and laterally enlarged flanged shoulders 119 to engage the under side of sector 92a is provided. By tightening screws 121 passing through enlargement 117 and threaded into body 118, straight edge 116 and jig are locked together.

If the device is to be used as a protractor in a vertical plane, a base 126 may be attached. As shown in FIG. 11, base 126 has a pedestal 127 from which projects upward stem 128 which is wider than slot 23. A fitting similar to fitting 118–119 fits in back of and through slot 23 and is held in engagement with stem 128 by screws 121. Accordingly, the protractor is held in upright position.

To measure angles, on arm 116 is aligned with a point or line from which the angular measurement is to be made. The movable sector 92a is turned to the proper angle by first loosening nut 101 to enable the sector to slip around rim 86 and then tightening the nut when the sector is in proper position. The vernier angle 108 and scale 107 on rim 86 may be used to measure the angle in usual manner. Alternative to nut 101, screws 109 and lock bars 111 may be used to lock the arms 116, 116a in place.

Directing attention now to FIGS. 14 and 15, the invention is also adaptable to square and rectangular shapes. A frame 126 is provided which consists of horizontal top and bottom edges 127 and vertical side edges 128, the insides of the edges formed with bevels 129. Side edges 128 are undercut as indicated by reference numeral 131 providing horizontal shoulder 132. Below frame edge 128 is horizontal gripping strip 133 partially overlapping undercut 131. Strip 133 is attached to edge 128 by screws 134.

Slide sections 136 are used in conjunction with frame 126. Each such slide section has one or more elongated slots 23d, 23e similar in dimensions to the slots 23 in previous modifications. The lateral edge of slide 136 fits into undercut 131 and fits under shoulder 132. The extreme outer edge 133 of slide 136 rests on strip 133. When screw 134 which holds strip 133 on frame 126 is tightened, slide 136 is gripped against movement. For precise location of slide 136 relative to frame 126 inch markings 137 are scribed on bevelled surface 129 and vernier markings 138 on slide 136. It will be observed that the locating extension 141 of slide 136 projects below strip 133. The outer and inner edges of the locating extension 141 are accurately ground and constitute measuring surfaces. Thus, a diamond-shape sleeveholder 46 or a button-shape sleeveholder 46A, 46B may be positioned in one of slots 23d, 23e. By measuring with inside calipers or gage blocks the distance X″ between the adjacent edge of surface 71 and inner edge of extension 141, the position of centerline 67 of sleeve 46A from the centerline 142 of frame 126 may be calculated (the distance between 142 and 141 being fixed and known). Similarly, by using outside calipers or micrometer in conjunction with the far side of surface 71 and the outside edge of locating extension 141, similar measurement may be obtained.

The number and shape of the slots 23e, 23f is subject to considerable variation. Preferably, notches 146 are formed on the edges of the slides 136 for the purpose of attaching work locators 31, 31A of the type heretofore described. Similarly, tapped holes 147 may be formed in slides 136 for attachment of various accessories such as work clamps 28.

Similarly, tapped holes 148 are formed in the corners or other suitable locations of frame 126 for legs 149 which support the jig above a work table. Standard clamps may be used to secure the work to the underside of the jig.

As an alternative, to accurately locate the center line of the frame a crossbar 151 may be used. Such a bar 151 has a hole at either end which aligns with tapped holes in frame 126 for screws 152 and also has dowel pins 153 which cooperate in accurately positioning bar 151 relative to frame 126. The bar is thus exactly along the center line of the frame measured from the side edges. At its center is a hole 154 which accurately locates the center of the frame. A center plug 42a is installed in hole 154 and is used as in the preceding modifications for locating the fittings.

The forms of the invention heretofore described secure the workpiece 27 to plate 21 by means of clamps such as clamp 28 and locate the workpiece relative to the plate by means of work locators 31, 31A. Drills and other tools may be brought into work position by inserting through fittings 46, 46A through centerlines 67 from the top, as viewed, for example, in FIGS. 5 and 6. However plate 21 may be inverted with workpiece still clamped and located in place so that the opposite side of the workpiece is uppermost. Plate 21 is then secured to the table of a machine such as a milling machine and other tools such as a milling cutter brought into work performing relationship on the work.

As a further alternative, the plate 21 may be turned on edge and work performed on an edge of the workpiece. Directing attention to the square jig of FIGS. 14 and 15, the workpiece may be tumbled on all four edges of frame 126 with frame 126 secured to a machine table. To assist in such positioning corners 161 project outward at each corner beyond the side edges of frame 126; corners 161 are accurately ground and the surfaces 162, 163 thereof are at right angles to each other. All these operations are in addition to securing the frame 126 to the table with the top edge shown in FIG. 15 uppermost or with said top edge down.

Hence, the device may be used as a drill jig and as a milling fixture in many positions of adjustment.

Although the foregoing invention has been described in some detail, by way of illustration and example for purposes of clarity of understanding it is understood that certain changes and modifications may be practiced within the spirit of the invention and scope of the appended claims.

What is claimed is:

1. In a locating device of the character described, a plate having substantially parallel top and bottom faces and an elongated slot of substantial uniform width extending normal to said faces and a work locating fitting adjustably positioned in said slot, said fitting having a central portion extending through said slot, a top flange bearing portion bearing against said top face, a bottom flange bearing portion bearing against said bottom face, said flange bearing portions being wider than said slot, one of said flange bearing portions being movable relative to said central portion and fastening means for clamping said movable flange bearing portion to said central portion to rigidly locate said fitting in said slot, said fitting formed with a first hole for reception of a bushing transverse to said faces and having at least one accurately finished measuring surface on at least a portion of its perimeter, said fitting being elongated in the direction of the length of said slot and formed with accurately finished surfaces at both ends.

2. A device according to claim 1 in which said hole is formed nearer one said accurately finished surface than the other.

3. A device for locating a drill bushing or the like relative to a workpiece comprising a locating plate formed with an elongated slot, adjustable means for locating a workpiece relative to said plate, a fitting slidable in said slot, means for locking said fitting in said slot, said fitting formed with an aperture to receive a bushing and having at least one accurately finished measuring surface, and a locating button removably positioned in said plate, said locating button formed with a finished second measuring surface cooperable with said first mentioned measuring surface for accurate location of said aperture in said fitting relative to said plate.

4. A fitting for a work locating device of the character described comprising a shank, top and bottom flanges on opposite ends of said shank wider than said shank, one said flange being movable toward and away from said shank and fastening means for clamping said movable flange to said shank, said fitting formed with a hole shaped to receive a bushing extending through said fitting and having at least one accurately finished measuring surface on at least a portion of its perimeter, said shank and at least one said flange being elongated and both ends of said last named flange being formed with parallel accurately finished surfaces.

5. A fitting according to claim 4 in which one said flange is formed with an overhanging shoulder adjacent said hole for cooperative engagement with a slip-removable bushing.

6. A fitting according to claim 4 in which one said flange has a cylindrical surface comprising said accurately finished surface.

7. A fitting according to claim 4 in which the axis of said hole is parallel to said finished surfaces and is nearer one said finished surface than the other.

8. A work locator for the purpose described comprising a shank, top and bottom flanges on opposite ends of said shank wider than said shank, one said flange being movable toward and away from said shank, fastening means for clamping said movable flange to said shank, and a locating button connected to one said flange, a flat thin crank connected at one end to one side flange and disposed transverse to said shank, said button being attached to said crank offset laterally relative to said shank.

9. A plate for a work holder of the character described having substantial parallel, broad top and bottom faces, said plate formed with a plurality of narrow elongated slots of substantial uniform width extending normal to said faces, said slots being arranged in a pattern, said plate formed with a sector-shaped cut-out and a sector-shaped insert of lesser included angle than said cut-out movable within said cut-out, said insert formed with an elongated second slot.

10. A plate according to claim 9 in which said plate is formed with a central hub and said hub and said insert with mating surfaces whereby said insert may be adjustably turned within said cut-out with said hub as a center, which further comprises means for locking said insert in position relative to said plate.

11. A plate according to claim 9 in which adjacent radial margins of said plate and insert are formed with cooperating vernier scales to indicate angular position of said insert relative to said plate.

12. A plate according to claim 9 in which said first-named and second slots are each provided with radially extending protractor arms and means for removably locating said arms in said slots.

13. In a locating device of the character described, a plate having substantially parallel top and bottom faces and an elongated slot of substantially uniform width extending normal to said faces and a work locating fitting adjustably positioned in said slot, said fitting having a central portion extending through said slot, a top flange bearing portion bearing against said top face, a bottom flange bearing portion bearing against said bottom face, said flange bearing portions being wider than said slot, one of said flange bearing portions being movable relative to said central portion and fastening means for clamping said movable flange bearing portion to said central portion to rigidly locate said fitting in said slot, said fitting formed with a first hole for reception of a bushing transverse to said faces and having at least one accurately finished measuring surface on at least a portion of its perimeter, said plate formed with a second hole and which further comprises a removable locating plug having a first shank fitting in said second hole, an enlarged first end member having an accurately finished cylindrical locating surface on one end of said shank and a second end member on the end of said shank opposite said first end member, said end members engaging opposite faces of said plate, said end members being wider than said second hole, one of said end members being movable relative to said shank, and second fastening means for fastening said detachable end member to said shank, to clamp said locating plug in said second hole, said cylindrical locating surface and said accurately finished surface being cooperable to locate said first mentioned hole relative to said second hole.

14. A device according to claim 13 which further comprises at least one work locating fitting in said slot for locating an edge of a workpiece relative to said plate, said work locating fitting having a second shank dimensioned to fit in said slot, a cylindrical locating button on one side of said plate and a detachable button on the side of said plate opposite said locating button.

15. A device according to claim 14 in which said locating button and detachable button are concentric with said shank and with each other.

16. A device according to claim 14 in which said locating button is connected to said second shank by a crank parallel to and underlying said plate and said locating button is laterally offset relative to said second shank.

17. In a locating device of the character described, a plate having substantially parallel top and bottom faces and an elongated slot of substantially uniform width extending normal to said faces and a work locating fitting adjustably positioned in said slot, said fitting having a central portion extending through said slot, a top flange bearing portion bearing against said top face, a bottom flange bearing portion bearing against said bottom face, said flange bearing portions being wider than said slot, one of said flange bearing portions being movable relative to said central portion and fastening means for clamping said movable flange bearing portion to said central portion to rigidly locate said fitting in said slot, said fitting formed with a first hole for reception of a bushing transverse to said faces and having at least one accurately finished measuring surface on at least a portion of its perimeter, said plate formed with a sector-shaped cut-out, a sector-shaped insert of lesser included angle than said cut-out movable within said cut-out, said insert formed with an elongated second slot dimensioned to receive the central portion of one of said fittings.

18. A device according to claim 17 in which said plate is formed with a central hub and said hub and said insert with mating surfaces whereby said insert may be adjustably turned within said cut-out with said hub as a center, which further comprises means for locking said insert in position relative to said plate.

19. A device according to claim 18 in which said hub is formed with a second hole and which further comprises a locating plug having a shank fitting in said second hole, an enlarged first end member having an accurately finished cylindrical locating surface on one end of said shank and a second end member on the end of said shank opposite said first end member, said end members engaging opposite faces of said plate, said end members being wider than said second hole, one of said end members being movable relative to said shank, and second fastening means for fastening said detachable end members to said shank, to clamp said locating plug in said second hole, said cylindrical locating surface and said accurately finished surface being cooperable to locate said first mentioned hole relative to said second hole.

20. A device according to claim 17 in which adjacent radial margins of said plate and insert are formed with cooperating vernier scales to indicate angular position of said insert relative to said plate.

21. A device according to claim 17 in which said first-named and second slots are each provided with radially extending protractor arms and means for removably locating said arms in said slots.

22. In a locating device of the character described, a plate having substantially parallel top and bottom faces and an elongated slot of substantially uniform width extending normal to said faces and a work locating fitting adjustably positioned in said slot, said fitting having a central portion extending through said slot, a top flange bearing portion bearing against said top face, a bottom flange bearing portion bearing against said bottom face, said flange bearing portions being wider than said slot, one of said flange bearing portions being movable relative to said central portion and fastening means for clamping said movable flange bearing portion to said central portion to rigidly locate said fitting in said slot, said fitting formed with a first hole for reception of a bushing transverse to said faces and having at least one accurately finished measuring surface on at least a portion of its perimeter, said plate formed with a substantially rectangular cut-out and which further comprises a substantially rectangular insert in said cut-out, said insert having the same length and lesser width than said cut-out and formed with an elongated second slot whereby by sliding said insert within said cut-out said second slot may be located relative to said plate, and means for locking said insert in position relative to said plate.

23. A device according to claim 22 which further comprises a second substantial rectangular insert having the same length as said cut-out, the combined widths of said first-mentioned and said second inserts being less than the length of said cut-out, said second insert being formed with a third slot substantially parallel to said second slot.

24. A device according to claim 22 in which said plate is provided with a locating edge transverse to said second slot cooperative with said measuring surface on said fitting when said fitting is positioned in said second slot surface to accurately locate said first hole relative to said edge.

25. A device according to claim 22 in which adjacent end margins of said insert and margins of said plate are formed with cooperating vernier scales to indicate position of said insert within said cut-out relative to said plate.

26. A plate for a work holder of the character described having substantially parallel broad top and bottom surfaces, said plate formed with a plurality of narrow elongated slots of substantially uniform width extending normal to said surfaces, said slots arranged in a pattern, said plate formed with a substantially rectangular cut-out, a substantially rectangular insert in said cut-out, said insert having the same length and lesser width than said cut-out and formed with an elongated second slot, whereby by sliding said insert within said cut-out, said second slot may be located relative to said plate, and means for locking said insert in position relative to said plate.

27. A plate according to claim 26 which further comprises a second substantially rectangular insert having the same length as said cut-out, the combined widths of said first-mentioned and said second inserts being less than the length of said cut-out, said second insert being formed with a third slot substantially parallel to said second slot.

28. A plate according to claim 26 in which said plate is provided with a locating edge transverse to said second slot.

29. A plate according to claim 26 in which adjacent end margins of said insert and margins of said plate are formed with cooperating vernier scales to indicate position of said insert within said cut-out relative to said plate.

References Cited by the Examiner

UNITED STATES PATENTS

| | | | |
|---|---|---|---|
| 1,871,178 | 8/32 | Hudson | 33—189 |
| 2,548,197 | 4/51 | Conner | 77—62 |
| 2,560,382 | 7/51 | Barr | 77—62 |
| 2,599,652 | 6/52 | Mitchell | 33—189 |
| 3,073,188 | 1/63 | May | 77—62 |

FOREIGN PATENTS

| | | |
|---|---|---|
| 159,761 | 4/05 | Germany. |
| 575,360 | 2/46 | Great Britain. |
| 793,954 | 4/58 | Great Britain. |
| 119,052 | 3/58 | Russia. |
| 162,872 | 4/58 | Sweden. |

WILLIAM W. DYER, Jr., *Primary Examiner.*